United States Patent
Poirier et al.

(10) Patent No.: US 10,841,582 B2
(45) Date of Patent: Nov. 17, 2020

(54) METHOD AND APPARATUS FOR ENCODING A PICTURE

(71) Applicant: INTERDIGITAL VC HOLDINGS, INC., Wilmington, DE (US)

(72) Inventors: Tangi Poirier, Thorigne-Fouillard (FR); Fabrice Leleannec, Mouaze (FR); Franck Galpin, Thorigne-Fouillard (FR); Fabien Racape, San Francisco, CA (US); Thierry Viellard, Osse (FR); Fabrice Urban, Thorigne-Fouillard (FR)

(73) Assignee: INTERDIGITAL VC HOLDINGS, INC., Wilmington, DE (US)

( * ) Notice: Subject to any disclaimer, the term of this patent is extended or adjusted under 35 U.S.C. 154(b) by 0 days.

(21) Appl. No.: 16/339,929

(22) PCT Filed: Aug. 31, 2017

(86) PCT No.: PCT/EP2017/071837
§ 371 (c)(1),
(2) Date: Apr. 5, 2019

(87) PCT Pub. No.: WO2018/065152
PCT Pub. Date: Apr. 12, 2018

(65) Prior Publication Data
US 2020/0045312 A1    Feb. 6, 2020

(30) Foreign Application Priority Data
Oct. 5, 2016   (EP) ..................... 16306311

(51) Int. Cl.
*H04N 19/119* (2014.01)
*H04N 19/124* (2014.01)
(Continued)

(52) U.S. Cl.
CPC ......... *H04N 19/119* (2014.11); *H04N 19/124* (2014.11); *H04N 19/147* (2014.11); *H04N 19/176* (2014.11)

(58) Field of Classification Search
None
See application file for complete search history.

(56) References Cited

U.S. PATENT DOCUMENTS

| 6,084,908 A * | 7/2000 | Chiang | G06T 7/20 348/E5.066 |
| 6,233,017 B1 * | 5/2001 | Chaddha | H04N 21/234327 348/412.1 |

(Continued)

FOREIGN PATENT DOCUMENTS

GB    2501493    10/2013

OTHER PUBLICATIONS

Yang et al., "Rate Control for H.264 with Two-Step Quantization Parameter Determination but Single-Pass Encoding", EURASIP Journal on Applied Signal Processing, vol. 2006, Article ID 63409, 2006, pp. 1-13 (Year: 2006).*

(Continued)

*Primary Examiner* — Reza Aghevli
(74) *Attorney, Agent, or Firm* — Invention Mine LLC

(57) ABSTRACT

A method and an apparatus for encoding a picture are disclosed. Such method comprises: —determining a rate-distortion cost (41) for a current block of said picture when said current block is not split into subblocks, taking into account quantization parameters assigned to the subblocks of said current block, —determining (42) whether said current block is split or not according at least to the determined rate-distortion cost, —encoding (43) the current block according to the result of determining whether a current block is split or not into subblocks.

11 Claims, 3 Drawing Sheets

(51) Int. Cl.
*H04N 19/147* (2014.01)
*H04N 19/176* (2014.01)

(56) References Cited

U.S. PATENT DOCUMENTS

| | | | | |
|---|---|---|---|---|
| 6,392,705 | B1* | 5/2002 | Chaddha | G06T 9/40 348/388.1 |
| 8,363,936 | B2* | 1/2013 | Divorra Escoda | H04N 19/46 382/167 |
| 2007/0071339 | A1* | 3/2007 | Yang | H04N 19/91 382/240 |
| 2009/0060362 | A1* | 3/2009 | Harmanci | H04N 19/19 382/238 |
| 2011/0243225 | A1* | 10/2011 | Min | H04N 19/13 375/240.12 |
| 2011/0249907 | A1* | 10/2011 | Fukuhara | G06K 9/527 382/235 |
| 2012/0114034 | A1* | 5/2012 | Huang | H04N 19/70 375/240.03 |
| 2012/0128070 | A1* | 5/2012 | Kim | H04N 19/61 375/240.13 |
| 2013/0058410 | A1* | 3/2013 | Yasugi | H04N 19/124 375/240.12 |
| 2013/0094775 | A1 | 4/2013 | Pomianowski et al. | |
| 2013/0343664 | A1* | 12/2013 | Kobayashi | H04N 19/50 382/233 |
| 2014/0301489 | A1* | 10/2014 | Laroche | H04N 19/80 375/240.29 |
| 2015/0131713 | A1 | 5/2015 | Kim et al. | |
| 2017/0280144 | A1* | 9/2017 | Dvir | H04N 19/174 |
| 2017/0310987 | A1* | 10/2017 | Wu | H04N 19/124 |
| 2018/0014017 | A1* | 1/2018 | Li | H04N 19/127 |
| 2018/0035116 | A1* | 2/2018 | Chen | H04N 19/18 |
| 2018/0376153 | A1* | 12/2018 | Gokhale | H04N 19/137 |
| 2019/0116361 | A1* | 4/2019 | Rusanovskyy | H04N 19/463 |
| 2019/0158843 | A1* | 5/2019 | Xu | H04N 19/573 |
| 2019/0158847 | A1* | 5/2019 | Cremon | H04N 19/174 |
| 2019/0342551 | A1* | 11/2019 | Zhu | H04N 19/146 |

OTHER PUBLICATIONS

Anonymous, "Reference software for ITU-T H.265 high efficiency video coding", International Telecommunication Union, ITU-T Telecommunication Standardization Sector of ITU, Series H: Audiovisual and Multimedia Systems, Infrastructure of audiovisual services—Coding of moving video, Recommendation ITU-T H.265.2, Oct. 2014, pp. 1-12.

Huang et al., "Fast Inter-Prediction Mode Decision Algorithm for HEVC", Signal, Image and Video Processing, vol. 11, No. 1, Jan. 2017, pp. 33-40.

Sato, K., "Proposal on Large Block Structure and Quantization", Joint Collaborative Team on Video Coding (JCT-VC) of ITU-T SG16 WP3 and ISO/IEC JTC1/SC29/WG11, Document JCTVC-C147, 3rd Meeting, Guangzhou, China, Oct. 7, 2010, pp. 1-8.

De Praeter et al., "Efficient Transcoding for Spatially Misaligned Compositions for HEVC", 2014 IEEE International Conference on Image Processing (ICIP), Paris, France, Oct. 27, 2014, pp. 2487-2491.

Yang et al., "Rate Control for H.264 with Two-Step Quantization Parameter Determination but Single-Pass Encoding", EURASIP Journal on Applied Signal Processing, vol. 2006, Article ID 63409, Dec. 2006, pp. 1-13.

Grosky et al., "Optimal Quadtrees for Image Segments", IEEE Transactions on Pattern Analysis and Machine Intelligence, vol. PAMI-5, No, 1, Jan. 1983, pp. 77-83.

Li et al., "Refining QP to Improve Coding Efficiency in AVS", 2013 IEEE International Conference on Image Processing (ICIP), Melbourne, Australia, Sep. 15, 2013, pp. 1528-1531.

\* cited by examiner

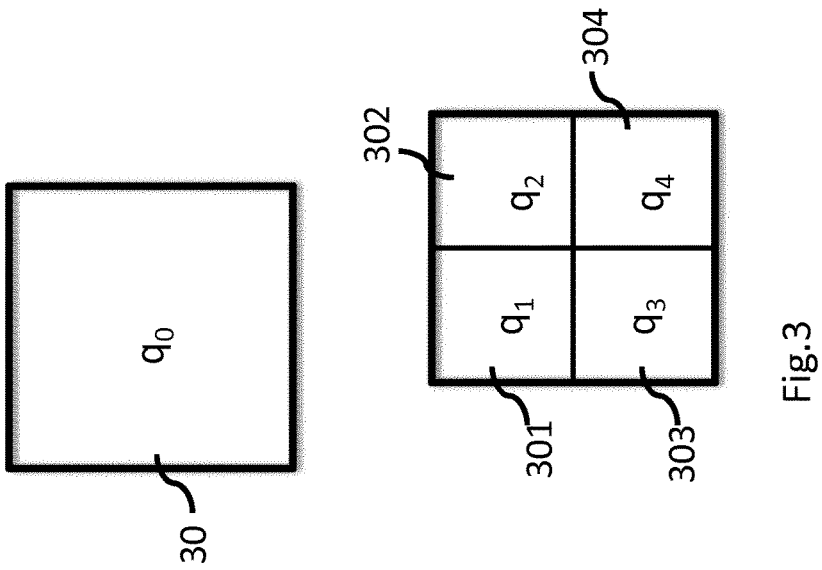
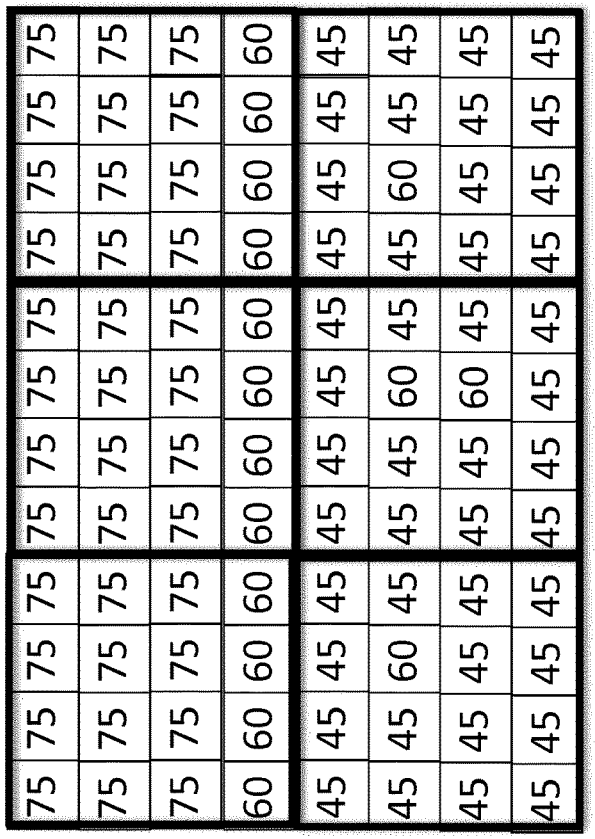

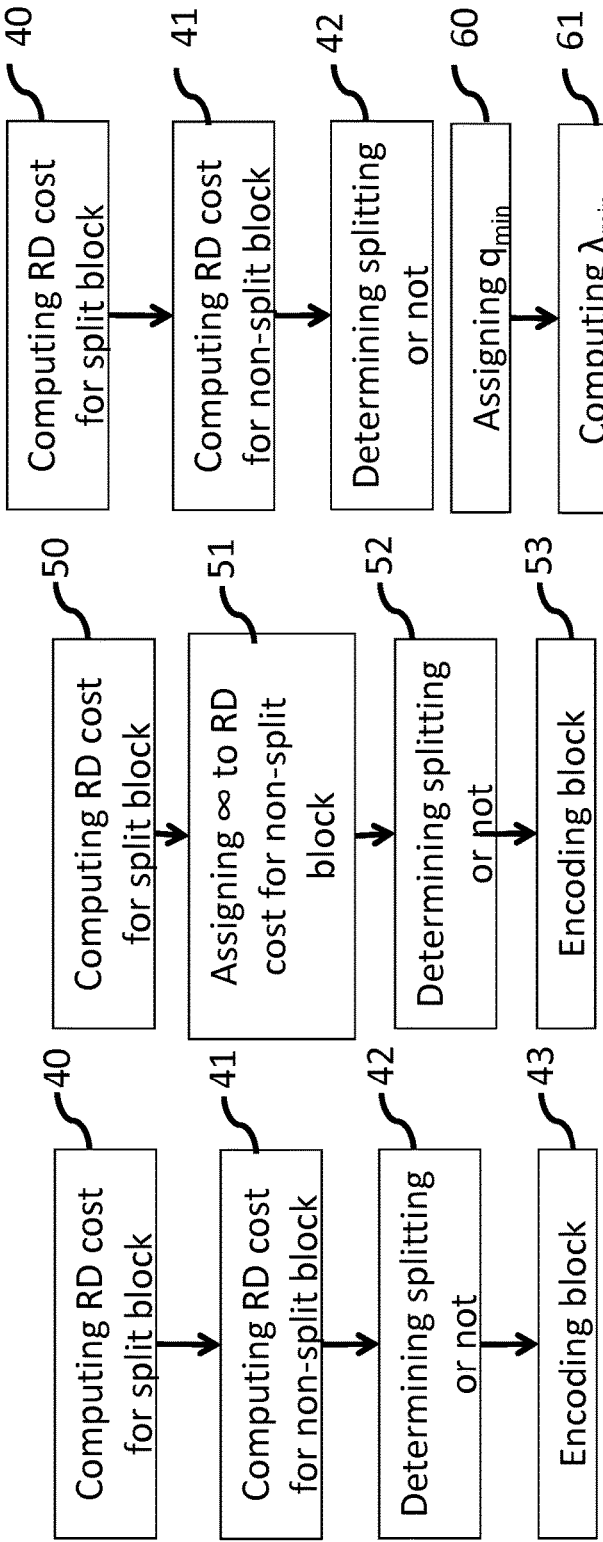
Fig.6
Fig.5
Fig.4
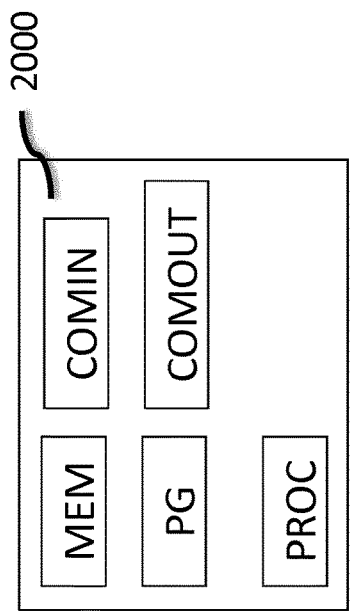
Fig. 7

METHOD AND APPARATUS FOR ENCODING A PICTURE

This application claims the benefit, under 35 U.S.C. § 365 of International Application PCT/EP2017/071837, filed Aug. 31, 2017, which was published in accordance with PCT Article 21(2) on Apr. 12, 2018, in English, and which claims the benefit of European Patent Application No. 16306311.8, filed Oct. 5, 2016.

1. TECHNICAL FIELD

A method and an apparatus for encoding a picture into a bitstream are disclosed.

2. BACKGROUND

Video encoding methods aims at optimizing the perceived video quality at a given bitrate. In such video encoding schemes, rate-distortion optimization (RDO) methods are used to achieve a trade-off between a visual quality of a video reconstructed from a video encoded into a bistream and a bitrate of the corresponding bistream.

A video is usually encoded picture-by-picture. For encoding a picture of the video, the picture is subdivided into a set of blocks, and then encoded block-by-block. In an RDO scheme, the visual quality of the reconstructed video is usually assessed by computing the distortion of the reconstructed video at the picture level, or at the block level.

For controlling the trade-off between quality and bitrate of the encoded video, some RDO methods may make use of a set of quantization parameters determined for regions of a picture to encode in a pre-encoding stage.

For instance, in such a pre-encoding stage, a perceptually-driven method divides the picture into fixed-size blocks and assigns a quantization parameter to each block based on an analysis of the content of the picture. Such a method is performed prior to the encoding of the picture, or prior to the encoding of the video. This preliminary steps delivers a set of quantization parameters to be used by the encoder when encoding the current picture.

When this preliminary step for determining a quantization parameter assigned to a block of the picture uses a size of block which is smaller than the size of block used by the encoder, the RD optimization method performed at the encoder may not be optimal. For instance, a QP assignment map is illustrated in FIG. 1, resulting from a preliminary step assigning a quantization parameter (represented by the number in each block of the picture) to small blocks of a picture to encode. For instance, such small blocks have a size of 16×16 pixels. The encoder that performs encoding of the same picture, and thus RD optimization, uses larger blocks, for instance blocks of size 64×64 pixels, as represented with thicker lines in FIG. 1. From FIG. 1, it appears that for encoding a larger block, the encoder may have several quantization parameters for each larger block given by the QP assignment map.

Therefore, there is a need for a new video encoding method using a suitable rate-distortion optimization when QP assignment map is provided to an encoder.

3. SUMMARY

According to an aspect of the present disclosure, a method for encoding a picture is disclosed. Such a method comprises:

computing a first rate-distortion cost for a current block in a splitting configuration of said picture, as a sum of rate-distortion costs computed for each subblock of the current block defined according to said splitting configuration, the rate-distortion computed for a subblock depending on a distortion computed for said subblock reconstructed from coding parameters associated with a best coding mode and a quantization parameter previously assigned to said subblock;

computing a second rate-distortion cost for said current block in a non-splitting configuration, depending on a distortion computed for said current block in said non-splitting configuration and taking into account quantization parameters previously assigned to the subblocks of said current block, determining whether said current block is split or not according to said first and second rate-distortion cost; and encoding the current block according to the result of determining whether a current block is split or not into subblocks.

According to the present principle, the splitting configuration for a current block is decided at the encoder by taking into account the quantization parameters assigned to subblocks of the current block for computing the rate-distortion cost for the non-split current block. When the quantization parameters have been assigned to subblocks in a pre-encoding stage, the present disclosure allows using such assigned quantization parameters in the rate-distortion decision and avoids re-performing the pre-encoding stage process for the current block.

According to an embodiment of the present disclosure, determining said second rate-distortion cost comprises, when the current block overlaps at least two subblocks to which different quantization parameters have been previously assigned, assigning an infinite value to said second rate-distortion cost computed.

This embodiment allows forcing the splitting of the current block when the current block overlaps subblocks being assigned with different values of quantization parameters. Such an embodiment allows preserving the assigned quantization parameters at the encoding process.

According to another embodiment of the present disclosure, determining said second rate-distortion cost comprises computing said second rate-distortion cost using a lagrangian parameter being a maximum value of lagrangian parameters associated with the quantization parameter assigned to subblocks of the current block.

This embodiment allows impacting the rate-distortion optimization regarding the decision of whether to split or not the current block. In this embodiment, the splitting of the current block is not forced, but the non-splitting configuration of the current block is penalized by a high lagrangian parameter in the computation of the rate-distortion cost, because a high lagrangian parameter value corresponds to a strong rate constraint. Therefore, this embodiment allows the non-splitting configuration to be selected by the rate-distortion optimization when the coding efficiency of such a non-splitting configuration is much better than the coding efficiency of the splitting configuration.

According to another embodiment of the present disclosure, the method further comprises using said lagrangian parameter being a maximum value of lagrangian parameters associated to the quantization parameters assigned to subblocks of the current block, for computing said second rate-distortion cost.

This embodiment allows using a same lagrangian parameter for computing the rate-distortion costs for the current block in the splitting configuration and in the non-splitting configuration. The corresponding rate-distortion costs can be validly compared, improving the prior art rate-distortion optimization, and yielding to better compression efficiency.

According to another embodiment of the present disclosure, the method further comprises using a quantization parameter being a minimum value of the quantization parameters assigned to subblocks of the current block for computing said second rate-distortion cost.

According to this embodiment, the choice of the maximum value of lagrangian parameters coupled with the minimum value of quantization parameters tends to penalize even more the non-splitting configuration as a low quantization parameter value tends to increase the coding rate of the current block.

According to another embodiment of the present disclosure, the method further comprises:
  assigning to the current block a quantization parameter equals to the minimum value of the quantization parameters assigned to subblocks of the current block,
  computing, for the current block, a new lagrangian parameter according to the quantization parameter assigned to the current block,
  determining a rate-distortion cost for a large block, using at least said new lagrangian parameter, said large block being larger than the current block and comprising the current block as a subblock,
  determining whether said large block is split or not for encoding.

According to another aspect of the present disclosure, an apparatus for encoding a picture is disclosed. Such an apparatus comprises a processor configured to:
  compute a first rate-distortion cost for a current block in a splitting configuration of said picture, as a sum of rate-distortion costs computed for each subblock of the current block defined according to said splitting configuration, the rate-distortion computed for a subblock depending on a distortion computed for said subblock reconstructed from coding parameters associated with a best coding mode and a quantization parameter previously assigned to said subblock;
  compute a second rate-distortion cost for said current block in a non-splitting configuration, depending on a distortion computed for said current block in said non-splitting configuration and taking into account quantization parameters previously assigned to the subblocks of said current block,
  determine whether said current block is split or not according to said first and second rate-distortion cost; and
  encode the current block according to the result of determining whether a current block is split or not into subblocks.

The present disclosure also provides a computer readable storage medium having stored thereon instructions for encoding a picture according to any one of the embodiments described in the disclosure.

According to one implementation, the different steps of the method for coding a picture as described here above are implemented by one or more software programs or software module programs comprising software instructions intended for execution by a data processor of an apparatus for encoding a picture, these software instructions being designed to command the execution of the different steps of the method according to the present principles.

A computer program is also disclosed that is capable of being executed by a computer or by a data processor, this program comprising instructions to command the execution of the steps of a method for encoding a picture as mentioned here above.

This program can use any programming language whatsoever and be in the form of source code, object code or intermediate code between source code and object code, such as in a partially compiled form or any other desirable form whatsoever.

The information carrier can be any entity or apparatus whatsoever capable of storing the program. For example, the carrier can comprise a storage means such as a ROM, for example a CD ROM or a microelectronic circuit ROM or again a magnetic recording means, for example a floppy disk or a hard disk drive.

Again, the information carrier can be a transmissible carrier such as an electrical or optical signal which can be conveyed via an electrical or optical cable, by radio or by other means. The program according to the present principles can be especially uploaded to an Internet type network.

As an alternative, the information carrier can be an integrated circuit into which the program is incorporated, the circuit being adapted to executing or to being used in the execution of the methods in question.

According to one embodiment, the methods/apparatus may be implemented by means of software and/or hardware components. In this respect, the term "module" or "unit" can correspond in this document equally well to a software component and to a hardware component or to a set of hardware and software components.

A software component corresponds to one or more computer programs, one or more sub-programs of a program or more generally to any element of a program or a piece of software capable of implementing a function or a set of functions as described here below for the module concerned. Such a software component is executed by a data processor of a physical entity (terminal, server, etc) and is capable of accessing hardware resources of this physical entity (memories, recording media, communications buses, input/output electronic boards, user interfaces, etc).

In the same way, a hardware component corresponds to any element of a hardware unit capable of implementing a function or a set of functions as described here below for the module concerned. It can be a programmable hardware component or a component with an integrated processor for the execution of software, for example an integrated circuit, a smartcard, a memory card, an electronic board for the execution of firmware, etc.

4. BRIEF DESCRIPTION OF THE DRAWINGS

FIG. 1 illustrates an exemplary QP assignment map to blocks of a picture,

Figure 2B:
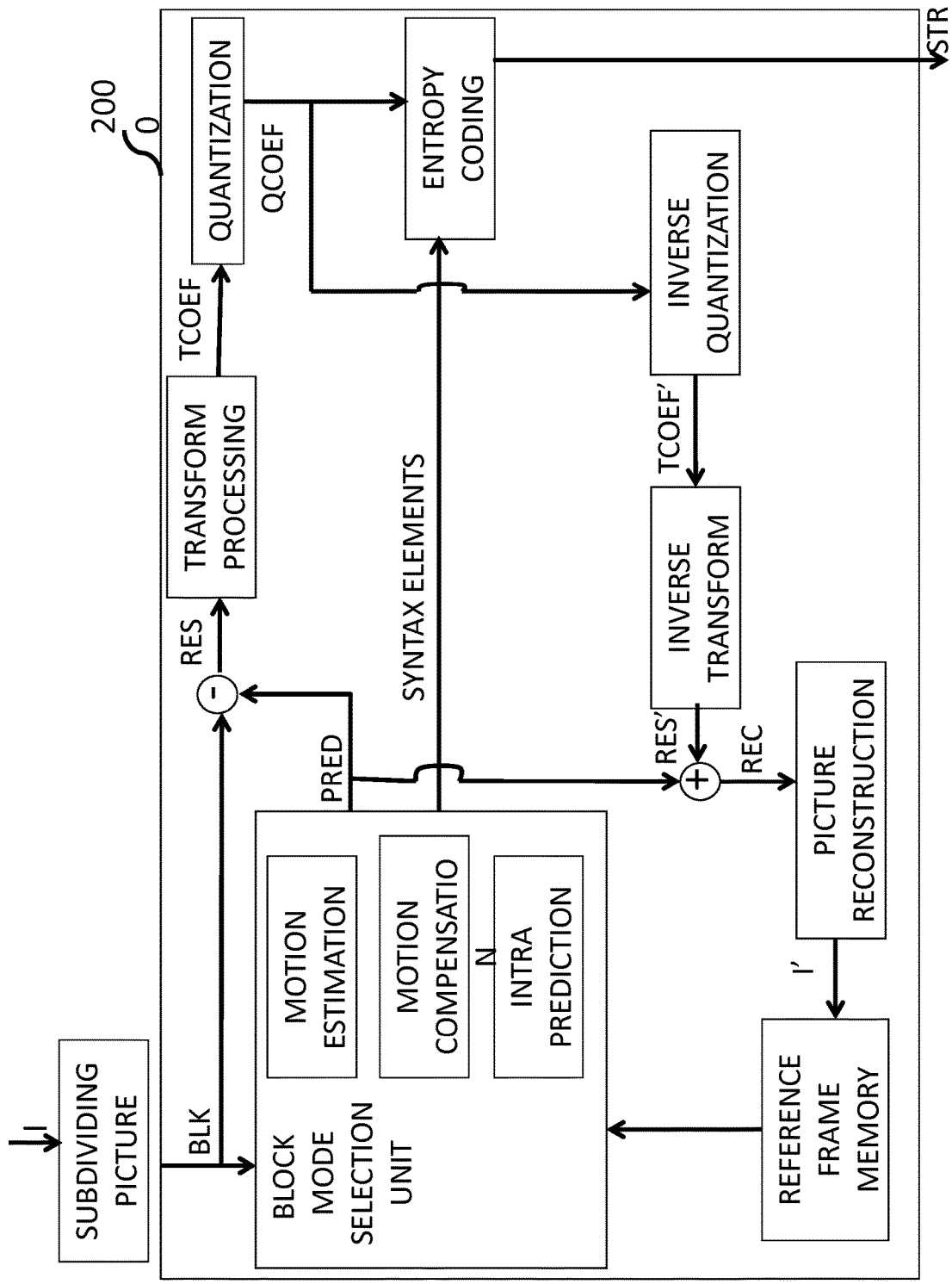
FIG. 2A illustrates exemplary blocks partitioning into subblocks.

FIG. 2B illustrates a block diagram of an exemplary method for encoding a video according to an embodiment of the present principle, FIG. 3 illustrates an exemplary QP assignment and block partitioning, FIG. 4 illustrates a flow diagram of an exemplary method for encoding a picture according to an embodiment of the present principle, FIG. 5 illustrates a flow diagram of an exemplary method for encoding a picture according to another embodiment of the present principle, FIG. 6 illustrates a flow diagram of an exemplary method for encoding a picture according to another embodiment of the present principle, FIG. 7 illustrates an exemplary encoder that may be used in one embodiment of the present principle.

5. DESCRIPTION OF EMBODIMENTS

The principle disclosed herein is described for encoding a picture from a video sequence, however the disclosed principle may be applied to still digital pictures as well.

For encoding, a picture is first subdivided into a set of units of pixels, which will be called blocks for simplicity.

Depending on the video coding standard used, a unit of pixels may be called macroblock (MB) such as in H.264/AVC or a Coding Tree Unit (CTU) such as in HEVC.

According to an H.264/AVC encoder, each macroblock comprises a 16×16 block of luminance samples and in the usual case of 4:2:0 color sampling, two corresponding 8×8 blocks of chroma samples. A macroblock of size 16×16 pixels may itself be subdivided into subblocks of size ranging from 8×8 to 4×4 pixels. Encoding of a macroblock may then be performed at the macroblock level or by encoding each subblock of the macroblock individually.

According to an HEVC encoder, a coding tree unit comprises a coding tree block (CTB) of luminance samples and two coding tree blocks of chrominance samples and corresponding syntax elements regarding further subdividing of coding tree blocks. A coding tree block of luminance samples may have a size of 16×16 pixels, 32×32 pixels or 64×64 pixels. Each coding tree block can be further subdivided into smaller blocks (known as coding blocks CB) using a tree structure and quadtree-like signaling. The root of the quadtree is associated with the coding tree unit. The size of the luminance coding tree block is the largest supported size for a luminance coding block. One luminance coding block and ordinarily two chrominance coding blocks form a coding unit (CU). A coding tree unit may contain one coding unit or may be split to form multiple coding units. The luminance and chrominance coding blocks can be further split in size. The HEVC standard supports variable block sizes from 64×64 down to 4×4 samples for prediction.

According to a VP9 encoder, the picture is subdivided into super-blocks of size 64×64 pixels, and each super-block may be divided into smaller blocks in a quad-tree fashion. Depending on the video coding standard used, different splitting configuration may be possible.

A square block may be split horizontally and/or vertically into 2 or 4 subblocks. FIG. 2A illustrates an exemplary splitting configuration for two square blocks 20 and 21. The block 21 has been split into 4 square subblocks 210, 211, 212, 213. A square subblocks may be further split horizontally and/or vertically. As shown in FIG. 2, the subblock 211 has been further split horizontally into 2 subblocks 2110 and 2111.

The vertical or horizontal subblocks issued from a vertical or horizontal splitting may not have a same size. For instance, FIG. 2A illustrates the vertical splitting of the block 20 into two subblocks 200 and 201, with a vertical splitting line positioned at the first quarter of the horizontal size of the block 20.

The splitting configuration of a block is generally decided by a rate-distortion optimization process when determining a best coding mode for coding the block.

FIG. 2B illustrates a block diagram of an exemplary encoder for encoding a video according to an embodiment of the present principle. The video encoder 2000 disclosed here below may be conforming to any video or still picture encoding schemes.

Classically, the video encoder 2000 may include several modules for block-based video encoding, as illustrated in FIG. 2B. A picture I to be encoded is input to the encoder 2000. The picture I is first subdivided into a set of blocks by a subdividing module. Each block BLK of the picture I is then processed for encoding. Depending on the video coding standard used, a block BLK may correspond to an H.264/AVC macroblock, or an HEVC coding tree unit, or any subblock from one of the units described above, or any other layout of subdivision of picture I.

The encoding and decoding processes described below are for illustration purposes. According to some embodiments, encoding or decoding modules may be added, or removed or may vary from the following modules. However, the principle disclosed herein could still be applied to these variants.

The encoder 2000 performs encoding of each block BLK of the picture I as follows. The encoder 2000 comprises a mode selection unit for selecting a coding mode for a block BLK of the picture to be coded, e.g. based on a rate/distortion optimization. Such a mode selection unit comprising:

- a motion estimation module for estimating motion between one current block of the picture to be coded and reference pictures,
- a motion compensation module for predicting the current block using the estimated motion,
- an intra prediction module for spatially predicting the current block.

The mode selection unit may also decide whether splitting of the block is needed according to rate/distortion optimization. In that case, the mode selection unit then operates for each subblock of the block BLK.

The block mode selection unit performs the encoding of the block for each candidate coding mode for the block BLK and computes a rate-distortion cost for each of these coding modes. The coding mode providing the lowest rate-distortion cost is selected as the best coding mode for the current block BLK. A candidate coding mode may be any coding mode available for coding the block and depends on the video compression standards used. For instance, for an HEVC coder, candidate coding modes may be chosen from one of the 36 intra prediction modes, an inter prediction mode using an estimated motion vector, a merge coding mode deriving motion information from spatial and.or temporal neighbor blocks, etc.

Once a coding mode is selected for the current block BLK or coding modes for subblocks of the current block BLk are selected, the mode selection unit delivers a predicted block PRED and corresponding syntax elements to be coded in the bitstream for performing the same block prediction at a decoder. When the current block BLK has been split, the predicted block PRED is formed by the set of predicted subblocks delivered by the mode selection unit for each subblocks.

A residual block RES is then obtained by subtracting the predicted block PRED from the original block BLK.

The residual block RES is then transformed by a transform processing module delivering a transform block TCOEF of transformed coefficients. The transform block TCOEF is then quantized by a quantization module delivering a quantized transform block QCOEF of quantized residual transform coefficients.

The syntax elements and quantized residual transform coefficients of the block QCOEF are then input to an entropy coding module to deliver coded data to form the coded bitstream STR.

The quantized residual transform coefficients of the quantized transform block QCOEF are processed by an inverse quantization module delivering a block TCOEF' of unquantized transform coefficients. The block TCOEF' is passed to an inverse transform module for reconstructing a block of residual prediction RES'.

A reconstructed version REC of the block BLK is then obtained by adding the prediction block PRED to the reconstructed residual prediction block RES'.

The reconstructed block REC is stored in memory for use by a picture reconstruction module. The picture reconstruction module performs reconstruction of a decoded version I' of the picture I from the reconstructed blocks REC. The reconstructed picture I' is then added to a reference picture memory for later use as a reference picture for encoding the following pictures of the set of pictures to code or for encoding subsequent blocks of the picture I.

When performing the rate-distortion optimization for a block BLK, the block mode selection unit may estimate the bitrate R of a candidate coding mode by performing all the encoding steps for encoding the block BLK in the candidate coding mode, that is by performing transform, quantization and entropy coding, so as to evaluate the real coding cost and distortion. The distortion D of the rate-distortion cost for the block BLK in the candidate coding mode is computed as the distortion between the original block BLK and the reconstructed block REC, for instance using a mean square error. The rate-distortion cost RD for a candidate coding mode is then computed by RD=D+λ×R, with λ being a lagrange parameter.

When the block BLK can be further split for encoding, the rate-distortion cost associated to the encoding of the block BLK in a splitting configuration, with the best coding modes associated to each subblock of the block BLK should be computed to be compared with the rate-distortion cost of the best coding mode when the block BLK is not split. So, that a decision is made as to whether to split the current block BLK for coding or not. Different splitting configurations may also be compared, such a horizontal splitting, vertical splitting, horizontal and vertical splitting, etc. . . . .

In a VP9 encoder, for instance, the rate-distortion optimization process is performed by taking into account a quantization parameter (QP) assignment map determined during a pre-encoding stage. Such a pre-encoding stage determines quantization parameter QP that should be used when encoding the blocks of the picture I. For instance, a QP assignment map is determined for blocks having a size of 16×16 pixels. Such a QP assignment map may be determined according to spatial activity computed over the 16×16 blocks and classifying the computed spatial activity values. Each class of spatial activity is then associated to a QP parameter.

In the VP9 encoder, the quadtree structure of a 64×64 super-block is decided as follows by the rate-distortion optimization, for a block of the quadtree:

If the block size is smaller or equal to a 16×16 block of the input QP assignment map, then the block is given the QP from the QP assignment map.

Otherwise, the QP is decided as a function of the block spatial activity which is re-computed over the whole block surface, The rate-distortion cost for the current block is then computed by:

$$Cost_{RD}=D+\lambda(q)\times R$$

Where D is the distortion (L2, i.e. mean square error) of the current block when coded with its coding parameters, R is the associated rate (in number of coding bits) and is the Lagrange parameter that depends on the block's quantization parameter.

When deciding the quad-tree structure, the video encoder uses competition between many block size by rate-distortion optimization to find the best block partitioning to encode the region overlapped by the blocks of the quad-tree structure. In the context of multiple QP encoding, this competition is done between heterogeneous blocks in terms of QP and Lagrange parameters, as illustrated on FIG. 3. FIG. 3 illustrates a competition for coding a large block 30 as whole with an assigned QP $q_0$ or as a sum of 4 subblocks 301, 302, 303, 304 with respective assigned QP $q_1$, $q_2$, $q_3$, and $q_4$. The rate-distortion cost for the block 30 coded as a whole block is $RD_0=D_0+\lambda(q_0)\times R_0$, with $D_0$ the distortion computed for the block 30 reconstructed from its coding parameters, $R_0$ the corresponding coding rate and $\lambda(q_0)$ the lagrange parameter associated to the assigned QP. The rate-distortion cost for the block 30 coded as 4 subblocks 301, 302, 303 and 304 is computed by $RD_1=\Sigma_{i=1}^{4}D_1+\lambda(q_i)\times R_i$, with $D_i$ the distortion computed for the subblock 30$i$ reconstructed from its coding parameters, $R_i$ the corresponding coding rate and $\lambda(q_1)$ the lagrange parameter associated to the QP assigned to the subblock 30$i$. The decision to split the block 30 is made according to the comparison of the coding cost $RD_0$ and $RD_1$. The lowest coding cost is chosen. According to this method, the rate-distortion cost associated to the split mode (RIM) is not correct, because rate distortion costs are mixed although they are not additive.

Therefore, the rate-distortion optimization process joint to the QP assignment map disclosed above is not optimal.

Therefore, a method for encoding a picture is disclosed. Such an encoding method allows determining a splitting configuration for a current block to be coded when quantization parameters have already been assigned to subblocks of the current block, for instance, when the quantization parameters have been decided in a pre-encoding stage. The disclosed method determines a rate-distortion cost for the current block when the current block is coded as a whole block, i.e. when the current block is not split, by taking into account the quantization parameters assigned to the subblocks of the current block.

FIG. 4 illustrates a flow diagram of an exemplary method for encoding a picture according to an embodiment of the present principle.

In step 40, a rate-distortion cost $RD_{split}$ for a current split block, for instance block 30 from FIG. 3, is computed as a sum of rate-distortion costs computed for each subblock of the split block, e.g. subblocks, 301, 302, 303 and 304, by:

$RD_{split}=\Sigma_{i=1}^{4}D_1+\lambda_{max}\times R_i$, with $D_i$ the distortion computed for the subblock 30$i$ reconstructed from the coding parameters of its best coding mode and using the QP $q_i$ assigned to this subblock, $R_i$ the corresponding coding rate and $\lambda_{max}$ a lagrange parameter corresponding to the maximum lagrange parameter from the set of lagrange parameters associated to the QP assigned to each subblock of the current block, $\lambda_{max}=\max\{\lambda_1,\lambda_2,\lambda_3,\lambda_4\}$, with $\lambda_i=\lambda(q_i)$, the lagrange parameter $\lambda_i$ being a lagrange parameter associated to the QP $q_i$ assigned to a subblock 30$i$.

In step 41, when the current block overlaps at least two subblocks to which different quantization parameters have been assigned, a rate-distortion cost $RD_{non-split}$ for the current block 30 coded as a whole, i.e. non split, is computed by $RD_{non-split}=D_0+\lambda_{max} \times R_0$, with $D_0$ the distortion computed for the block 30 reconstructed from the coding parameters of its best coding mode in a non-split configuration and $R_0$ the corresponding coding rate.

According to an embodiment of the present disclosure, when computing the rate-distortion cost $RD_{non-split}$ for the current block, the current block is assigned a quantization parameter $q_{min}$ corresponding to the minimum value of the quantization parameters assigned to the subblocks of the current block, i.e. $q_{min}=\min\{q_1,q_2,q_3,q_4,\}$ in the example shown in FIG. 3. That is to say that when determining a best coding mode for the current block in a non-split configuration, the quantization parameter $q_{min}$ is assigned to the current block for the quantization process.

In step 42, splitting or not splitting the current block is determined by comparing the rate-distortion costs $RD_{non-split}$ and $RD_{split}$. If the lowest rate-distortion cost is $RD_{split}$, the current block is split, otherwise the current block is not split.

In step 43, the current block is encoded according to the decision made at step 42 on whether to split or not the current block. The encoding of the current block is performed, for instance, as disclosed in the encoding process disclosed with FIG. 2B.

FIG. 5 illustrates a flow diagram of an exemplary method for encoding a picture according to another embodiment of the present principle.

In step 50, a rate-distortion cost $RD_{split}$ for a current split block, for instance block 30 from FIG. 3, is computed as a sum of rate-distortion cost computed for each subblock of the split block, e.g. subblocks, 301, 302, 303 and 304, by:

$RD_{split}=\Sigma_{i=1}^{4}D_i+\lambda_i \times R_i$, with $D_i$ the distortion computed for the subblock $30i$ reconstructed from the coding parameters of its best coding mode and using the QP $q_i$ assigned to this subblock, $R_i$ the corresponding coding rate and $\lambda_i$ the lagrange parameter associated to the QP assigned to the subblock=$\lambda(q_i)$.

According to this embodiment, in step 51, when the current block overlaps at least two subblocks to which different quantization parameters have been assigned, the rate-distortion cost $RD_{non-split}$ for the current block coded as a whole, i.e. non-split, is assigned an infinite value. Otherwise, if the subblocks overlapped by the current block have been assigned a same quantization parameter q, therefore a best coding mode is determined for the current block in a non-split configuration using the quantization parameter q and the rate-distortion cost $RD_{non-split}$ associated to this best coding mode is computed using a lagrange parameter associated to the quantization parameter q.

In step 52, splitting or not splitting the current block is then determined by comparing the rate-distortion costs $RD_{non-split}$ and $RD_{split}$. If the lowest rate-distortion cost is $RD_{split}$, the current block is split, otherwise the current block is not split.

According to this embodiment, when the current block overlaps at least two subblocks to which different quantization parameters have been assigned, the non-split configuration is never selected as the corresponding rate-distortion cost has been assigned an infinite value. Therefore, in that case, splitting of the current block is imposed by the pre-determined QP assignment map.

In step 53, the current block is encoded according to the decision made at step 52 on whether to split or not the current block. The encoding of the current block is performed, for instance, as disclosed in the encoding process disclosed with FIG. 2B.

FIG. 6 illustrates a flow diagram of an exemplary method for encoding a picture according to a further embodiment of the present principle. Steps 40, 41 and 42 are similar to the steps disclosed with reference to FIG. 4.

In step 60, when the non-split configuration for the current block has been selected in step 42, the quantization parameter $q_{min}$ is assigned to the current block.

In step 61, a new lagrange parameter $\lambda_{min}$ associated to the quantization parameter $q_{min}$ is computed.

In step 62, a rate-distortion cost is computed for a larger block overlapping the current block in the case that this larger block is coded in a split mode. In that case, the rate-distortion cost for the larger block in the split configuration can be computed by applying the process disclosed with FIG. 4 at step 40 to the larger block. A rate-distortion cost associated to a best coding mode for the larger block in a non-split configuration is also computed.

In step 63, splitting or not splitting the larger block is then determined by comparing the rate-distortion costs computed at step 62.

At step 64, the larger block is encoded according to the decision made at step 63 on whether to split or not the larger block. If at step 63, it is determined to split the larger block, then each block comprised in the larger are encoded independently using the best coding estimated for these blocks and the assigned quantization parameter. In the case where the best coding mode for one of these blocks is a split coding mode, each subblock of the block is coded independently using its best coding mode and the assigned quantization parameter.

If at step 63, it is determined that the larger block is not split, the larger block is encoded as a whole using the best coding mode estimated for the larger block and the quantization parameter assigned at step 62. In that case, the current block is merged with its neighbor blocks forming a merged larger block and the current block is encoded in the coded data of the large block.

The encoding of the larger block, whether split or not, may be performed as disclosed in the encoding process disclosed with FIG. 2B.

FIG. 7 illustrates the simplified structure of an apparatus (2000) for encoding a picture according to an embodiment of the present principle. Such an apparatus 2000 is configured to implement the method for encoding a picture according to the present principle according to any embodiments disclosed above. The functional units of the encoder apparatus 2000 have been disclosed in reference to FIG. 2B. The structural apparatus 2000 disclosed below may be configured to implement each of these functional units individually or in combination, and according to any one of the embodiments of the principle disclosed above in reference with FIG. 4, 5 or 6.

According to an embodiment, the encoder apparatus 2000 comprises a processing unit PROC equipped for example with a processor and driven by a computer program PG stored in a memory MEM and implementing the method for encoding a picture according to the present principle.

At initialization, the code instructions of the computer program PG are for example loaded into a RAM (not shown) and then executed by the processor of the processing unit PROC. The processor of the processing unit PROC implements the steps of the method for encoding a picture which has been described here above, according to the instructions of the computer program PG.

The encoder apparatus 2000 comprises a communication unit COMOUT to transmit an encoded bitstream STR to a data network.

The encoder apparatus 2000 also comprises an interface COMIN for receiving a picture or a video to encode.

The invention claimed is:

1. A method for encoding a picture comprising:

computing a first rate-distortion cost for a current block in a splitting configuration of the picture as a sum of rate-distortion costs computed for each subblock of the current block according to the splitting configuration, the rate-distortion cost computed for a subblock depending on a distortion computed for the subblock reconstructed from coding parameters providing a lowest rate-distortion cost and a quantization parameter previously assigned to the subblock;

computing a second rate-distortion cost for the current block in a non-splitting configuration of the picture, the rate-distortion cost computed for the current block depending on a distortion computed for the current block reconstructed from coding parameters providing the lowest rate-distortion cost and quantization parameters previously assigned to the subblocks of the current block and using as a Lagrange parameter a maximum value of Lagrange parameters associated with the quantization parameter assigned to subblocks of the current block;

determining whether to split the current block into subblocks for encoding according to the first rate-distortion cost and the second rate-distortion cost, resulting in an encoding split determination; and encoding the current block according to the encoding split determination.

2. The method according to claim 1, wherein computing the second rate-distortion cost comprises assigning an infinite value as the second rate-distortion cost when the current block includes at least two subblocks to which different quantization parameters have been previously assigned.

3. The method according to claim 1, further comprising using as the Lacirancie parameter a maximum value of Lagrange parameters associated with the quantization parameters assigned to subblocks of the current block for computing the first rate-distortion cost.

4. The method according to claim 3, further comprising using as a quantization parameter a minimum value of the quantization parameters assigned to subblocks of the current block for computing the second rate-distortion cost.

5. The method according to claim 1, further comprising:

assigning to the current block a quantization parameter equal to the minimum value of the quantization parameters assigned to subblocks of the current block;

computing, for the current block, a new Lagrange parameter according to the quantization parameter assigned to the current block;

determining a rate-distortion cost for a large block using at least the new Lagrange parameter, wherein the large block is larger than the current block and comprises the current block as a subblock;

determining whether to split the large block for encoding.

6. An apparatus for encoding a picture comprising:

a processor and a memory storing instructions that, when executed by the processor, cause the apparatus to:

compute a first rate-distortion cost for a current block in a splitting configuration of the picture, as a sum of rate-distortion costs computed for each subblock of the current block according to the splitting configuration, the rate-distortion cost computed for a subblock depending on a distortion computed for the subblock reconstructed from coding parameters providing a lowest rate-distortion cost and a quantization parameter previously assigned to the subblock;

compute a second rate-distortion cost for the current block in a non-splitting configuration, depending on a distortion computed for the current block in the non-splitting configuration and taking into account quantization parameters previously assigned to the subblocks of the current block and using as a Lagrange parameter a maximum value of Lagrange parameters associated with the quantization parameter assigned to subblocks of the current block;

determine whether to split the current block into subblocks for encoding according to the first rate-distortion cost and the second rate-distortion cost, resulting in an encoding split determination; and encode the current block according to the encoding split determination.

7. The apparatus according to claim 6, wherein computing the second rate-distortion cost comprises assigning an infinite value as the second rate-distortion cost when the current block includes at least two subblocks to which different quantization parameters have been previously assigned.

8. The apparatus according to claim 6, wherein the apparatus is further configured to use as the Lagrange parameter a maximum value of Lacirancie parameters associated with the quantization parameters assigned to subblocks of the current block for computing the first rate-distortion cost.

9. The apparatus according to claim 8, wherein the apparatus is further configured to use as a quantization parameter a minimum value of the quantization parameters assigned to subblocks of the current block for computing the second rate-distortion cost.

10. The apparatus according to claim 6, wherein the processor is further configured to:

assign to the current block a quantization parameter equals to the minimum value of the quantization parameters assigned to subblocks of the current block;

compute, for the current block, a new Lagrange parameter according to the quantization parameter assigned to the current block;

determine a rate-distortion cost for a large block, using at least the new Lagrange parameter, wherein the large block is larger than the current block and comprises the current block as a subblock;

determine whether to split the large block for encoding.

11. A non-transitory computer-readable medium including instructions for causing one or more processors to perform:

computing a first rate-distortion cost for a current block in a splitting configuration of the picture as a sum of rate-distortion costs computed for each subblock of the current block according to the splitting configuration, the rate-distortion cost computed for a subblock depending on a distortion computed for the subblock reconstructed from coding parameters providing a lowest rate-distortion cost and a quantization parameter previously assigned to the subblock;

computing a second rate-distortion cost for the current block in a non-splitting configuration of the picture, the rate-distortion cost computed for the current block depending on a distortion computed for the current block reconstructed from coding parameters providing the lowest rate-distortion cost and quantization parameters previously assigned to the subblocks of the current block and using as a Lagrange parameter a maximum value of Lagrange parameters associated with the quantization parameter assigned to subblocks of the current block;

determining whether to split the current block into subblocks for encoding according to the first rate-distortion cost and the second rate-distortion cost, resulting in an encoding split determination; and encoding the current block according to the encoding split determination.

* * * * *

UNITED STATES PATENT AND TRADEMARK OFFICE
CERTIFICATE OF CORRECTION

PATENT NO. : 10,841,582 B2
APPLICATION NO. : 16/339929
DATED : November 17, 2020
INVENTOR(S) : Tangi Poirier et al.

It is certified that error appears in the above-identified patent and that said Letters Patent is hereby corrected as shown below:

In the Claims

At Column 11, Line 40, Claim 3, replace "Lacirancie" with --Lagrange--
At Column 12, Line 27, Claim 8, replace "Lacirancie" with --Lagrange--

Signed and Sealed this
Twenty-sixth Day of December, 2023

Katherine Kelly Vidal
*Director of the United States Patent and Trademark Office*